April 16, 1963 E. MEINICKE 3,085,296
DEVICE FOR OPENING BALES OF FIBER
Filed Sept. 10, 1959
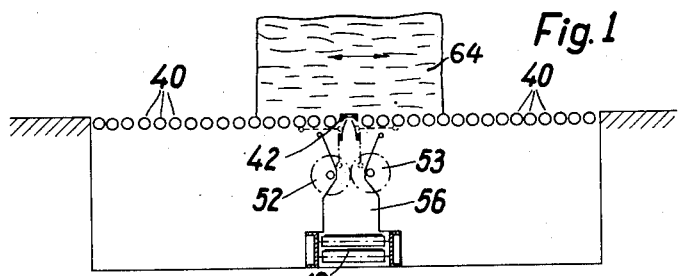
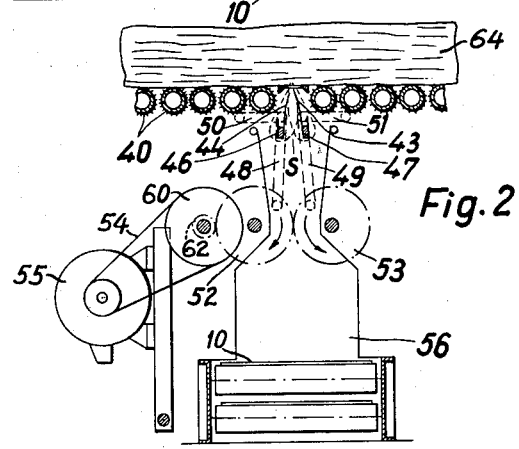
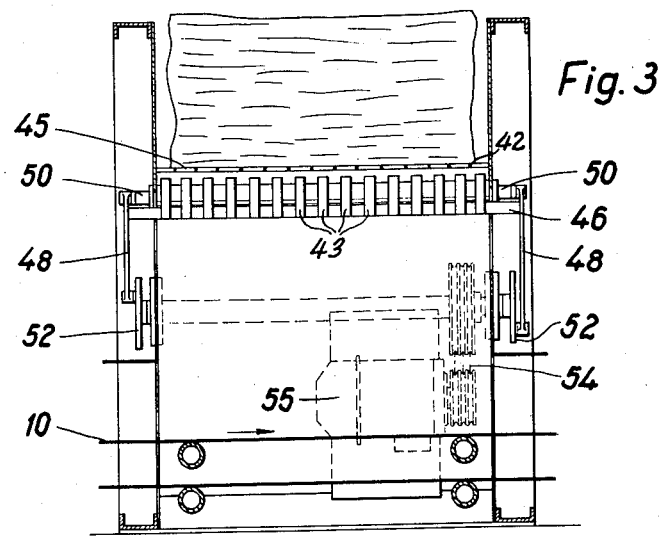
Inventor:
Erich Meinicke

United States Patent Office 3,085,296
Patented Apr. 16, 1963

3,085,296
DEVICE FOR OPENING BALES OF FIBER
Erich Meinicke, Rheydt, Germany, assignor to Trutzschler & Co., Rheydt-Odenkirchen, Germany
Filed Sept. 10, 1959, Ser. No. 839,181
9 Claims. (Cl. 19—81)

Natural and synthetic fibers to be treated in the textile industry are compressed to hard bales for transportation and other purposes. Such bales are picked open mechanically in so-called opening and cleaning devices.

The invention relates to a device for opening such bales of fibers and to a machine for blending fibers. In the heretofore known devices the fibers are picked from the bale manually. In such a case, however, a feeding of lumps or large bundles of fiber is unavoidable. Further such a feed is not performed continuously. In other heretofore known devices an opener roll provided with striking tools is moved past the bales of fibers.

The present invention proposes an opener having a machine frame comprising a sliding path along which is reciprocated a bale of fibers, said sliding path being discontinuous, or having a gap therein, for accommodating opener means which attack the bale through the gap. Also, beneath said opener means there passes a belt conveyor for transfering the detached fibers to further treating machines.

A plurality of sliding paths and associated opener means for removing fibers can be arranged in parallel and be combined by a common reservoir through which passes a collecting belt conveyor for all sliding paths.

The opener means comprise picking fingers composed of oppositely aranged springs, which stick into the lower surface of the bale of fibers and which are closed during this sticking step. For removing the picked fibers from the picking fingers the latter are opened after being withdrawn from the bale so that the fibers may fall into the reservoir.

The picking fingers preferably are leaf springs mounted so as to move along two oppositely curved paths. The picking fingers are distributed over the width of the machine and are arranged below a grating in the said gap, and which grating lies within the sliding path of the machine frame; said picking fingers stick from below through the openings of the grating when the bale is moved along the sliding path.

The picking fingers are mounted on bars extending the width of the machine, and connected with said bars is a system of oscillating and reciprocating levers. This system of levers comprises longer lever arms serving as crank arms which reciprocates for a kinematic drive with counterrotating driving wheels, whilst shorter oscillating lever arms pivoted thereto serve as steering arms. The counterrotating driving wheels are driven by an infinitely variable drive means.

The sliding path for the bales is composed of driven supporting rolls arranged in coplanar relation close together on both sides of the grating in the machine frame at the level of the floor. The surface of the supporting rolls may be provided with teeth, striker pins or the like. The single rolls or groups of rolls are provided with driving means. Rolling paths may be provided for storing a supply of bales containing bleanding components to be delivered to the opener at will.

One embodiment of the invention is schematically shown in the drawing; in particular FIG. 1 is a schematic side elevation of a picking device having its supporting rolls at the level of the floor;

FIG. 2 is an enlarged cross-section of the picking fingers and its driving means; and FIG. 3 is a showing, partly in elevation, and partly in section, of a bale breaker corresponding to that shown in FIGS. 1 and 2 but having a modified form of drive mechanism.

In the machine frame of the bale-breaker in a common plane are mounted supporting rolls 40, forming a sliding path. Between two supporting rolls 40 is arranged a grating 42. The total length of the sliding paths on both sides of the grating 42 approximately corresponds to twice the length of a bale of material which, as indicated in FIG. 1 by a double arrow, is reciprocated over the sliding paths. During the reciprocating movements between two sets of supporting rolls 40 the bale passes over the grating 42 which extends over the whole width of the machine. Below the grating 42 are arranged picking fingers which consist of counterdriven leaf springs 43, 44 driven in unison and which have their free ends arranged to project through the openings 45 of the grating 42 in their upper position. For this purpose the picking fingers 43, 44 are connected with vertically reciprocable cross-bars 46, 47 which again are connected with an angle lever system for movement thereby in a generally vertical direction. This latter system consists of the longer lever arms 48, 49 and the shorter lever arms 50, 51. The longer lever arms 48, 49 serve as crank arms and are rotatably connected to the counterrotating crank wheels or gears 52, 53. The upper ends of the lever arms 48, 49 are pivotally connected to the inner ends of the shorter lever arms 50, 51. The free, or outer, ends of the shorter lever arms 50, 51 in a suitable manner are pivoted to the machine frame.

The driving wheel or gear 52 for the one side of the counterrotating drive shown in FIG. 3 receive the driving torque from the electric motor 55 over a V-belt variator 54 (FIG. 3). The driven pulley 60 of the variator may drive a pinion 62 that meshes with gear 52.

The cross-bars 46, 47 with the springs 43, 44 of the picking fingers are connected with the longer lever arms 48, 49 of the angle lever system (FIG. 3). The two opposite picking fingers are moved by means of rotation of the wheels 52, 53, which actuate bars 46, 48, so that the tips of the picking fingers move in a kidney-shaped curve (shown in dashed lines in FIG. 2). The tips of the counteracting picking fingers stick from below through the interstices of the grating at the top of their movement into the bale and pick out a flock of fiber. Each pair of picking fingers holds firmly the detached flock of fibers because of the clamping action when the fingers move downwardly and toward each other and moves the flock to the point of intersection S of the curves (FIG. 2). As soon as the tips of the picking fingers reach this point an opening movement thereof occurs because of the movement of the supporting angle lever system 48, 49, 50, 51 to release the flock of fibers, which then falls down through the hopper-like structure 56 onto the collecting belt conveyor 10, which closes the structure 56 from below.

The supporting rolls 40 are arranged with only a small distance therebetween, as will be seen from FIG. 2. They are driven by independent or common drive means and are controlled such, that the bale of fiber is slidingly reciprocated across the grating 42. For this purpose the supporting rolls are provided with pins or a suitable tooth arrangement (not shown in the drawings) which may detach impurities from the layer of material to be picked off when the bale is reciprocated. Said impurities may fall down through the gaps between the rolls. In this way the impurities are removed from the bale of fiber. This removal of the impurities is still enhanced by the reciprocating control of the bale and by the profiled surface of the rolls 40.

Adjacent to the driven supporting rolls 40 forming the sliding paths are arranged rolling paths there, which may take up a supply of bales of material and which allow such bales to be delivered to the supporting rolls when it is desired to change the blend of fibers or to add coloured blending components.

A number of juxtapositioned picking finger bale breaker devices can be combined with a single collecting belt conveyor, the belt of which passes through all breaker devices for transfering the picked out fibers to a further preparation machine. The combination of a plurality of machine frames such that the sliding paths with the rolls 40 lie side by side is not shown in the drawing. The collecting conveyor belt 10, however, runs through the total system perpendicularly with respect to the direction of movement of the bales.

The invention yields the advantage that by picking off the fibers and by reciprocating the bales it is very easy to vary the blending components and to achieve a rather good pre-cleaning and a complete and thorough blending action. The picking fingers detach the flocks of fibers even from very hard compressed bales, and by the picking action is achieved a so effective relaxation of the fibers, that a formation of nits is substantially avoided.

The members of pairs of picking fingers distributed over the width of the machine, the spring tension thereon, the length of spring and the distance between the single fingers are variable to adopt the device to the material to be treated. The grating 42 is also designed correspondingly. It is also possible to replace the shown drive with an infinitely variable V-belt drive by any other driving means. It is important, in any case, that the pairs of picking fingers, by means of a crank system, receive a curvilinear movement for a positive picking out of the single flocks and a release of the flocks.

The device according to the invention is capable of opening bales of cotton; here the simultaneous removal of impurities proves especially advantageous. However, it is also possible to open bales of synthetic fibers, e.g. synthetic wool, or other bales of fibers. By the arrangement of sliding or rolling paths at the level of the floor it is easy to put the bales onto the sliding path and to vary at ease the fibers and fiber blends. Here it is sufficient to take a bale of the desired type of fibers from the supply and put it on to the sliding paths.

What I claim is:

1. A device for opening bales of fiber and for blending fibers comprising a machine frame, a sliding path composed of a plurality of rolls arranged in said machine frame, means for reciprocating bales of fiber on said sliding path, grating means arranged in said sliding path, pairs of oppositely arranged picking fingers below said sliding path for projecting through said grating means and for picking material from the bales reciprocated on said sliding path.

2. A device for opening bales of fibers and for blending fibers comprising a machine frame, a sliding path composed of a plurality of rolls arranged in said machine frame, means for reciprocating bales of fibers on said sliding path, grating means arranged in said sliding path, pairs of oppositely arranged picking fingers below said sliding path for projecting through said grating means and for picking material from the bales reciprocated on said sliding path, means for driving and guiding said pairs of picking fingers automatically to stick into the lower supported surface of the reciprocated bale of fibers, to perform a closing movement during the sticking step, to remove the clamped-in fibers and to drop them.

3. The invention as claimed in claim 2 wherein said picking fingers are counteractuated leaf springs.

4. The invention as claimed in claim 2 wherein said picking fingers are leaf springs guided in counteracting tracks, said leaf springs which are distributed over the width of the machine projecting with their tips through the openings of said grating for engaging the reciprocated bale.

5. A device for opening bales of fibers and for blending fibers comprising a machine frame, a sliding path composed of a plurality of rolls arranged in said machine frame, means for reciprocating bales of fibers on said sliding path, grating means arranged in said sliding path, pairs of oppositely arranged picking leaf springs for projecting through said grating means, drive means including a pair of counterrotating crank wheels, a first pair of lever arms serving as crank arms articulated to said pair of crank wheels, a second pair of lever arms articulated to said first pair of lever arms and to said picking leaf springs for driving the latter to stick into the lower supported surface of the reciprocated bale of fibers, to perform a closing movement during the sticking step, to remove the clamped-in fibers and to drop them.

6. The invention as claimed in claim 5 wherein a plurality of pairs of picking leaf springs being mounted on a pair of cross-bars actuated by said drive means.

7. A device for opening bales of fibers and for blending fibers comprising a machine frame, a sliding path composed of a plurality of rolls arranged in said machine frame, means for reciprocating bales of fibers on said sliding path, grating means arranged in said sliding path, pairs of oppositely arranged picking leaf springs for projecting through said grating means, drive means consisting of a pair of counter-rotating crank wheels, a first pair of lever arms serving as crank arms articulated to said pair of crank wheels, a second pair of lever arms articulated to said first pair of lever arms and to said picking leaf springs for driving the latter to stick into the lower supported surface of the reciprocated bale of fibers, to perform a closing movement during the sticking step, to remove the clamped-in fibers and to drop them and, an infinite variable V-belt drive for said drive means.

8. In an apparatus for opening up fiber bales: frame means, a sliding path composed of a plurality of rolls supported by said frame means for receiving and reciprocating a fiber bale to be opened up, grating means arranged in said sliding path, picking fingers arranged below said grating means and located opposite to each other for cooperation with each other, actuating means operatively connected to said oppositely located picking fingers and operable to move the same in opposite directions with regard to each other so as to move oppositely located fingers at their upper ends through said grating means into said bale toward each other and again to withdraw said fingers from said bale while opening said fingers when the latter have left said bale whereby material picked out from the bale by said fingers will be released.

9. An apparatus according to claim 8, which includes a pair of counter-rotating crank wheels having pivotally connected thereto link means respectively carrying cooperating picking fingers.

References Cited in the file of this patent

UNITED STATES PATENTS

| | | |
|---|---|---|
| 551,677 | Jaeger | Dec. 17, 1895 |
| 1,545,367 | Tice | July 7, 1925 |
| 2,445,912 | Frost | July 27, 1948 |

FOREIGN PATENTS

| | | |
|---|---|---|
| 673,523 | France | Oct. 8, 1929 |
| 1,191,797 | France | Apr. 13, 1959 |